No. 731,937. Patented June 23, 1903.

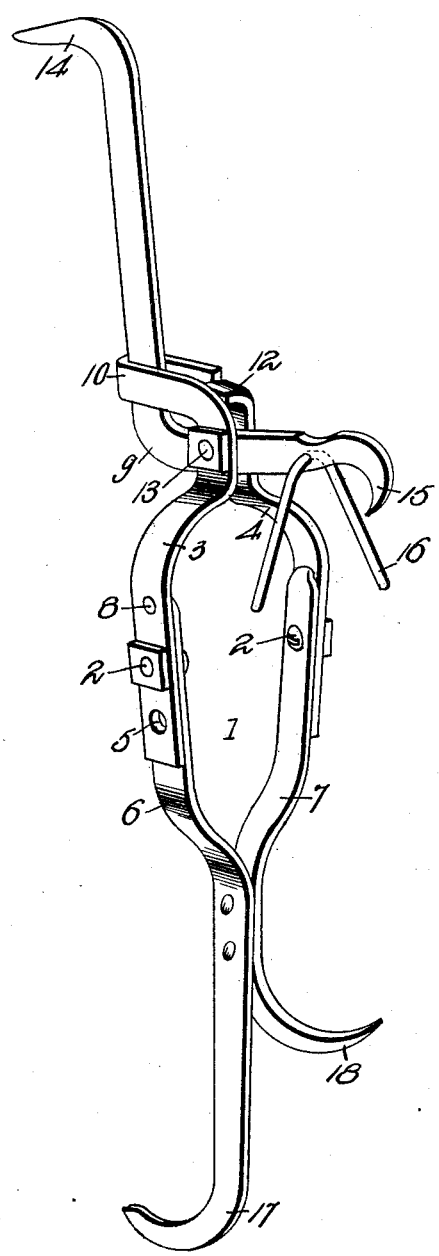

UNITED STATES PATENT OFFICE.

JOSEPH E. McCLANAHAN, OF WAUKOMIS, OKLAHOMA TERRITORY.

ANIMAL-POKE.

SPECIFICATION forming part of Letters Patent No. 731,937, dated June 23, 1903.

Application filed November 8, 1902. Serial No. 130,574. (No model.)

*To all whom it may concern:*

Be it known that I, JOSEPH E. McCLANAHAN, a citizen of the United States, residing at Waukomis, in the county of Garfield and Territory of Oklahoma, have invented a new and useful Animal-Poke, of which the following is a specification.

This invention relates to improvements in animal-pokes.

The object of the present invention is to improve the construction of animal-pokes and to provide a simple and comparatively inexpensive device of great strength and durability adapted to be readily adjusted to fit the neck of an animal and capable of preventing the same from passing through fences and other structures.

The invention consists in the construction and novel combination and arrangement of parts hereinafter fully described, illustrated in the accompanying drawing, and pointed out in the claims hereto appended.

The figure of the drawing is a perspective view of an animal-poke constructed in accordance with this invention.

Referring to the drawing, 1 designates a yoke designed to be arranged on the neck of an animal and composed of two sides provided with adjustable upper and lower bars or members detachably secured together by bolts 2 or other suitable fastening devices. The upper bars or members 3 and 4 are provided at their lower portions with perforations 5, and the lower bars or members 6 and 7 are provided at their upper or inner ends with outwardly-extending studs 8, arranged to fit in the said perforations. The upper or inner ends of the lower bars or members are also provided with perforations for the reception of the bolts 2, which hold the lugs or studs 8 in engagement with the perforations of the upper bars or members 3 and 4. By this construction the yoke is adapted to be varied in size to enable it to fit large and small animals.

The bar or member 3 has its upper end spaced from the upper end of the bar or member 4 to receive a lever 9, and it is bent outwardly or forwardly at right angles and doubled on itself to provide a loop or keeper 10 for guiding and limiting the movement of the lever 9. The upper terminal of the bar or member 4 is bent inward at an angle to provide a laterally-extending arm or portion 12, which fits against the bar or member 3 at the inner end of the loop or keeper 10.

The lever 9 is approximately L-shaped, and one arm is arranged horizontally and is pivoted between the upper spaced portions of the bars or members 3 and 4 by a bolt 13 or other suitable fastening device, which passes through the bars or members 3. The other arm of the lever 9 is arranged in an upright position and is extended forward to provide a fence-engaging portion 14. The end of the horizontal arm is curved downward and pointed to provide a spur 15 for prodding the back of an animal, and the said spur is guided by means of laterally-extending divergent arms 16, forming a fork and adapted to straddle the back of the animal. When the upper arm of the lever engages a fence or other obstruction, the lever will be swung backward and will prod the animal and prevent it from breaking down a fence or other structure.

The bottom or lower end of the yoke may be constructed similar to the upper end, or the bar or member 6 may be extended to form a rigid fence-engaging arm 17 and the bar or member 7 extended to form a spur 18. The lower end of the arm 17 is curved forward, as shown, and the spur is curved rearward and pointed.

It will be seen that the animal-poke is exceedingly simple and inexpensive in construction, that it is strong and durable, and that it is adapted to be readily adjusted to fit animals of different sizes. It will also be clear that when it comes in contact with a fence or other structure it will effectively prod the animal and prevent it from breaking down the same.

What is claimed is—

1. An animal-poke comprising a yoke, and a lever having a spur and carrying downwardly-divergent arms for contact with an animal, said arms being adapted to guide the spur.

2. An animal-poke comprising a yoke, an approximately L-shaped lever fulcrumed on the yoke and provided at its inner or rear end with a spur and having diverging laterally-extending arms arranged to guide the spur into engagement with an animal, substantially as described.

3. An animal-poke comprising a yoke having two sides spaced apart at one end of the yoke, one of the sides being extended inward to form an arm or lug, and the other side being extended outward or forward at an angle and doubled to form a loop, a lever fulcrumed in the space between the sides and operating in the loop and provided with means for engaging an animal, substantially as described.

In testimony that I claim the foregoing as my own I have hereto affixed my signature in the presence of two witnesses.

JOSEPH E. McCLANAHAN.

Witnesses:
M. O. GARRETT,
W. AUSTIN.